US008924038B2

(12) United States Patent
Michelis et al.

(10) Patent No.: US 8,924,038 B2
(45) Date of Patent: Dec. 30, 2014

(54) METHOD FOR DETERMINING A TORQUE SET VALUE FOR A STEERING WHEEL FOR A POWER STEERING SYSTEM OF A MOTOR VEHICLE

(75) Inventors: Andre Michelis, Grigny (FR); Pierre Pilaz, Saint Marcel l'eclaire (FR); Pascal Moulaire, Roanne (FR); Serge Gaudin, Saint Jean de Touslas (FR)

(73) Assignee: JTekt Europe (FR)

( * ) Notice: Subject to any disclaimer, the term of this patent is extended or adjusted under 35 U.S.C. 154(b) by 0 days.

(21) Appl. No.: 13/384,610

(22) PCT Filed: Jul. 20, 2010

(86) PCT No.: PCT/FR2010/051522
§ 371 (c)(1),
(2), (4) Date: Apr. 30, 2012

(87) PCT Pub. No.: WO2011/010058
PCT Pub. Date: Jan. 27, 2011

(65) Prior Publication Data
US 2012/0203397 A1    Aug. 9, 2012

(30) Foreign Application Priority Data

Jul. 22, 2009   (FR) ...................................... 09 55103

(51) Int. Cl.
*B62D 5/04*   (2006.01)
*B62D 6/00*   (2006.01)

(52) U.S. Cl.
CPC ..................................... *B62D 6/008* (2013.01)
USPC ................................................ 701/1; 701/41

(58) Field of Classification Search
CPC ....................................................... B62D 6/008
USPC .......................................................... 701/1, 41
See application file for complete search history.

(56) References Cited

U.S. PATENT DOCUMENTS

2008/0021614 A1 *   1/2008   Endo et al. ....................... 701/41
2008/0201038 A1 *   8/2008   Jung et al. ....................... 701/41
2009/0138158 A1 *   5/2009   Greul et al. ..................... 701/42

FOREIGN PATENT DOCUMENTS

EP          1234746 A1 *   8/2002

OTHER PUBLICATIONS

International Search Report issued Dec. 3, 2010 by European Patent Office re: PCT/FR2010/051522; citing: EP 1 234 746 A1 and US 2009/138158 A1.

* cited by examiner

Primary Examiner — Fadey Jabr
Assistant Examiner — Yazan A Soofi
(74) Attorney, Agent, or Firm — Cantor Colburn LLP

(57) ABSTRACT

The invention relates to a power steering system in which the set value for torque or force at the steering wheel is predetermined on the basis of various parameters and information so as to provide the most driving comfort in all conditions of driving the vehicle. The torque or force set value is predetermined on the basis of the sideways acceleration of the vehicle, the acceleration in turn being predetermined mainly from an estimate of the force exerted on the rack, and preferably also predetermined by other methods, with the estimate being weighted among all of the obtained values. Said method is particularly useful for vehicles provided with electrical power steering.

5 Claims, 2 Drawing Sheets

METHOD FOR DETERMINING A TORQUE SET VALUE FOR A STEERING WHEEL FOR A POWER STEERING SYSTEM OF A MOTOR VEHICLE

TECHNICAL FIELD

The present invention generally relates to power steering systems of motor vehicles, more particularly the electric power steering systems driven by an electronic computer onboard the vehicle. Still more particularly, this invention relates to a method for determining a set value for torque or force for a steering wheel, for a power steering system of a motor vehicle, aiming to provide the driver of the vehicle with a comfortable driving experience under all conditions.

BRIEF DESCRIPTION OF RELATED ART

The context of the invention is recalled by FIG. 1 of the appended diagrammatic drawing, which shows the main mechanical and other elements of a power steering system, here electric, for a motor vehicle.

Such a steering system comprises a mechanical part having a steering wheel 2 rotatably connected to a steering column 3, whereof the remote end of the steering wheel 2 bears steering pinion engaged with a rack 4, slidingly mounted in a steering gear-box 5. The two opposite ends of the rack 4 are respectively connected, via connecting rods 6 and 7, to the right and left steering wheels (not shown) of the vehicle. The steering comprises, to assist the manual force exerted by the vehicle's driver on the wheel 2, an electric assist motor 8 with two directions of rotation. The output shaft of the electric assist motor 8 is coupled, via a worm reduction gear 9 with a cylindrical worm wheel or gear train, to the steering column 3 or to the steering pinion or directly to the rack 4, so as to transmit an engine torque (possibly also a resisting torque) to the steering system. The electric assist motor 8 is steered by an onboard electronic computer 10, which receives and processes various signals, coming from sensors.

In one usual embodiment, the electronic computer 10 in particular receives an electronic signal coming from a torque sensor 11 placed on the steering column 3, the sensor 11 thus measuring the torque exerted by the driver on the wheel 2, as well as an electric signal coming from an angle sensor 12 of the steering wheel 2. This electronic computer 10 can also receive an electric signal coming from an angular position sensor 13 of the electric assist motor 8, as well as an electric signal coming from a speed sensor (not shown) of the vehicle.

From such signals, the electronic computer 10 drives the electric assist motor 8, so that said motor provides, at all times, an assisting torque or force, to help the movements manually exerted by the driver on the steering wheel 2, by amplifying the force applied by the driver on the steering wheel or potentially by compensating that force, using predefined "assistance laws."

However, depending on the usage conditions of the vehicle, it appears that such assistance does not always provide the driver with the expected driving comfort and force on the steering wheel. In this respect, it should be noted that the torque of the steering wheel, or more accurately the force of the steering wheel, is the predominant criterion in the comfort of driving a motor vehicle and in the driver's perception of the "dynamics" of the motor vehicle.

Patent document EP 1234746 A1 discloses an electric power steering system for a motor vehicle, in which a torque set value for the steering wheel is calculated according to various measured parameters, including the transverse or sideways acceleration of the motor vehicle. This parameter here is determined solely by a transverse acceleration sensor.

The present invention aims to resolve the previously stated drawbacks, and its primary aim is to provide better driving comfort under all circumstances, in other words in all driving conditions for the concerned motor vehicle, by acting on the torque or force at the steering wheel according to the dynamic driving conditions.

To that end, the invention relates to a method for determining a set value for torque or force at the steering wheel, for a power steering system of a motor vehicle, the steering being a rack-and-pinion steering system and the set value of the torque or force being determined as a function of various parameters and/or information, said set value of the torque or force at the steering wheel being determined according to the sideways acceleration of the vehicle, the acceleration in turn being determined mainly from an estimate of the force exerted on the rack of the steering system.

Thus, the idea at the base of the present invention comprises determining the set value of torque or force at the steering wheel from the sideways acceleration, the acceleration in turn being determined from the estimate of the force exerted on the rack of the steering system. It is recalled that the sideways acceleration of a motor vehicle is defined as the centripetal acceleration of the trajectory of motor vehicle's center of gravity, brought into a reference related to the vehicle.

Advantageously, the method according to the invention for determining a set value of the torque or force at the steering wheel also takes one or more of the following elements into account, with weighting:

Sideways acceleration obtained from the angular position of the steering wheel and the longitudinal speed of the vehicle;
  Sideways acceleration measured using a gyroscopic sensor;
  Sideways acceleration determined from the yaw rate and the longitudinal speed of the vehicle;
  Sideways acceleration determined as a function of the speeds of the wheels, more particularly as a function of the gap between the speeds of the wheels of the same axle of the vehicle.

Taking into account the sideways acceleration obtained from the angular position of the steering wheel and the longitudinal speed of the vehicle makes it possible to compensate the effect of the friction present in the entire steering system, from the road to the driver's hands. Taking into account at least one of the other three optional modes for determining the sideways acceleration makes it possible to increase the robustness of the torque force set value at the steering wheel, in light of the modifications made to the vehicle and/or the outside conditions.

In the phase for determining the sideways acceleration from an estimate of the force exerted on the rack, this force may in particular be estimated from data internal to the electric power steering system, such as: assisting torque of the electric motor or electric current passing through that motor, speed of rotation of the motor, torque exerted by the driver, while the model assuming the form of a data table is used to go from the estimated force to the sideways acceleration.

For the other mode(s) of determining the sideways acceleration, advantageously used in combination with the preceding one, one uses sensors, information, and functions already present or available on modern motor vehicles, in particular those equipped with an electronic stability program system called "ESP." The implementation of the invention therefore does not require the addition of extra components.

The weighting, to be done between all simultaneous determinations of the sideways acceleration of the vehicle, can be done by assigning each of the sideways acceleration values a "weight," which, preferably, depends on the value of the sideways acceleration itself. One thus obtains a theoretical sideways acceleration, which is exploited as the input value of a main data table that ultimately provides the set value for the torque or force at the steering wheel.

Alternatively, it is also possible to first determine a theoretical set value of the force or torque at the steering wheel from the sideways acceleration, then to weight that set value as a function of the same "weights," rather than directly weighting the sideways acceleration.

Furthermore, when the speed of rotation of the steering wheel increases substantially, it is advantageous, either to increase the consistency of the force or torque at the steering wheel when the latter is held, or to damp the alternating rotational movement of the steering wheel when the latter is released, to also determine the set value of the torque or force at the steering wheel as a function of the speed of rotation of the steering wheel. This speed of the steering wheel may be determined by the calculation, from the instantaneous speed of rotation of the electric assist motor of the steering system.

BRIEF DESCRIPTION OF THE DRAWINGS

The invention will be better understood using the following description, in reference to the appended diagrammatic drawing, illustrating, as an example, one embodiment of this method for determining a set value of the torque at the steering wheel.

DETAILED DESCRIPTION

Figure 1:
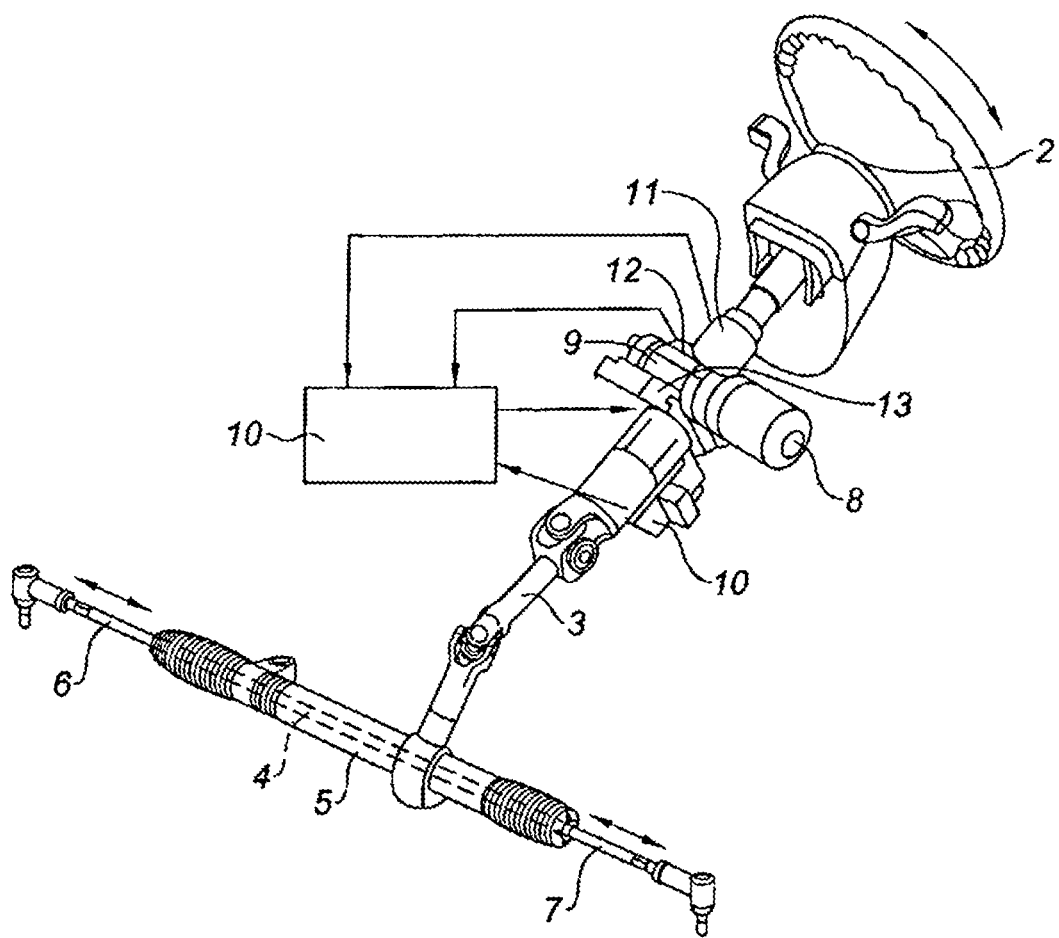
FIG. 1 (already mentioned) is a perspective view of an electric power steering system to which the inventive method is applicable.
Figure 2:
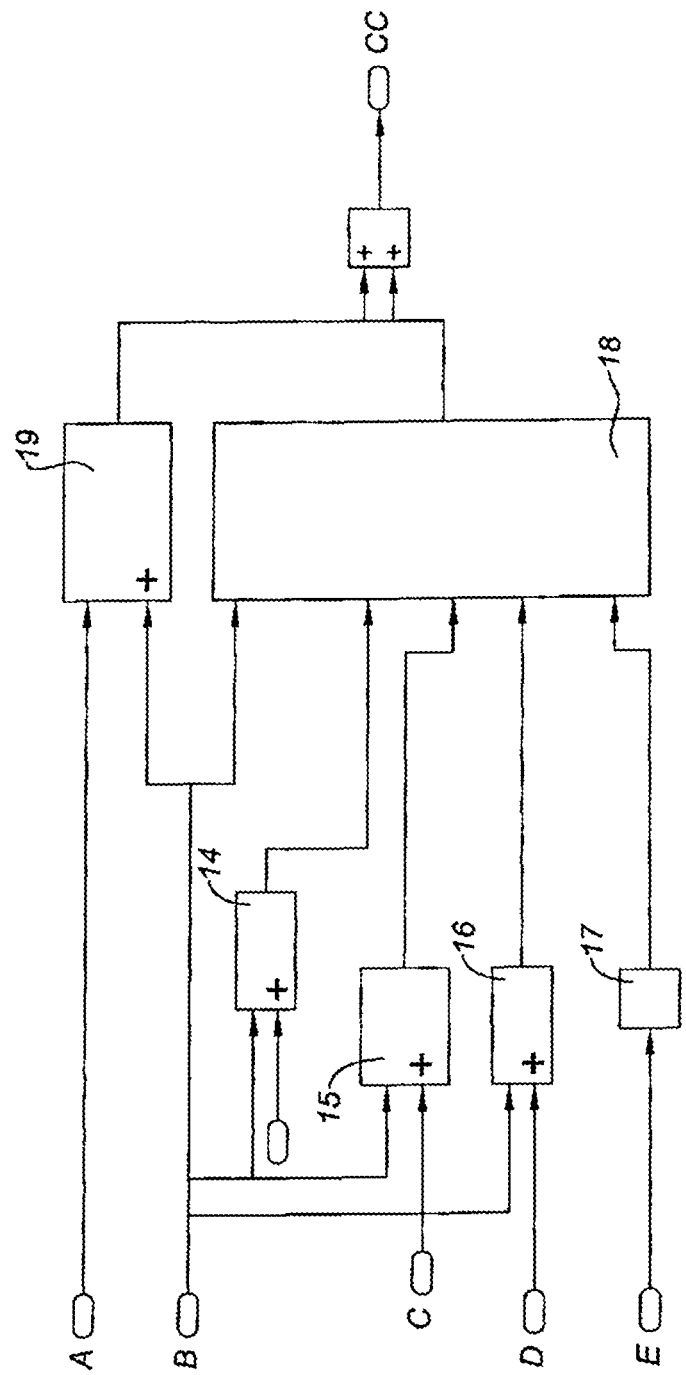
FIG. 2 is a simplified block diagram, summarizing this method.

In reference to FIG. 2, and more particularly the left portion of that figure, the various parameters taken into account by the inventive method are symbolically indicated, namely:
A: angular speed of the steering wheel 2;
B: longitudinal speed of the vehicle;
C: yaw rate of the vehicle;
D: angular position of the steering wheel 2;
E: sideways acceleration of the vehicle.

A block 14 calculates a theoretical sideways acceleration from the theoretical force on the rack 4, calculated by the electronic computer 10 of the electric power steering system, and the longitudinal speed B of the vehicle.

Another block 15 calculates a theoretical sideways acceleration from the longitudinal speed B of the vehicle and the yaw rate C of the vehicle, which in turn is measured by a gyroscope.

Still another block 16 calculates a theoretical sideways acceleration from the longitudinal speed B of the vehicle and the angular position D of the steering wheel.

E represents a sideways acceleration of the vehicle measured by a gyroscope, which is processed by a block 17 incorporating a low pass filter.

In a manner not shown, an additional block can also calculate a theoretical sideways acceleration from the deviation between the speeds of the wheels of the same axle of the vehicle, the path of that axle, i.e. the spacing between its two wheels, and the longitudinal speed of the vehicle.

In a block 18, bringing together the outputs of the various blocks previously mentioned and also receiving the longitudinal speed the of the vehicle, the determination of the torque set value at the steering wheel is done; this determination combines the various sideways acceleration values, in particular provided by the blocks 14 to 17, with suitable weighting.

A last block 19 performs a damping function, from the angular speed A of the steering wheel and taking the longitudinal speed B of the vehicle into account.

The combination of the outputs of the blocks 18 and 19 ultimately provides the torque set value CC at the steering wheel that is exploited by the power steering system.

The invention claimed is:

1. A method for determining a set value for torque or force at a steering wheel, for a power steering system of a motor vehicle, the steering system being a rack-and-pinion steering system and the set value of the torque or force at the steering wheel being determined as a function of various parameters and/or information, the method including the following steps:
   estimating the force exerted on the rack of the steering system, to obtain a force estimate exerted on the rack of the steering system,
   determining, by a computer, a sideways acceleration of the vehicle from the force estimate exerted on the rack of the steering system, and
   using the sideways acceleration of the vehicle for determining a set value for torque or force at a steering wheel according to the sideways acceleration of the vehicle.

2. The method according to claim 1, wherein the determination of the set value of the torque or force at the steering wheel also takes one or more of the following elements into account, with weighting:
   obtaining the sideways acceleration from the angular position of the steering wheel and a longitudinal speed of the vehicle;
   measuring the sideways acceleration using a gyroscopic sensor;
   determining the sideways acceleration from a yaw rate and the longitudinal speed of the vehicle;
   determining the sideways acceleration as a function of a gap between speeds of wheels of a same axle of the vehicle.

3. The method according to claim 1, wherein the estimate of the force exerted on the rack is done from data internal to the electric power steering system, comprising: assisting torque of the electric motor or electric current passing through that motor, speed of rotation of the motor, torque exerted by a driver, while the model assuming a form of a data table is used to go from the estimated force to the sideways acceleration.

4. The method according to claim 2, wherein weighting, done between all simultaneous determinations of the sideways acceleration of the vehicle, is done by assigning each of the sideways acceleration values a "weight," which depends on the value of the sideways acceleration itself, to obtain a theoretical sideways acceleration, which is exploited as an input value of a main data table that ultimately provides the set value for the torque or force at the steering wheel.

5. The method according to one of claim 1, wherein the set value for torque or force at the steering wheel is also determined as a function of a speed of rotation of the steering wheel, either to increase consistency of the force or torque at the steering wheel when the latter is held, or to damp an alternating rotational movement of the steering wheel when the latter is released.

* * * * *